(12) United States Patent
Fujikawa et al.

(10) Patent No.: US 7,144,113 B2
(45) Date of Patent: Dec. 5, 2006

(54) VIRTUAL IMAGE DISPLAY APPARATUS

(75) Inventors: Takayuki Fujikawa, Nagoya (JP); Hiroshi Ando, Nagoya (JP)

(73) Assignee: Denso Corporation, Kariya (JP)

( * ) Notice: Subject to any disclaimer, the term of this patent is extended or adjusted under 35 U.S.C. 154(b) by 67 days.

(21) Appl. No.: 10/921,136

(22) Filed: Aug. 19, 2004

(65) Prior Publication Data
US 2005/0052617 A1 Mar. 10, 2005

(30) Foreign Application Priority Data
Aug. 22, 2003 (JP) .............................. 2003-298322

(51) Int. Cl.
G02B 27/22 (2006.01)
(52) U.S. Cl. .................... 353/7; 359/472; 359/458; 353/10
(58) Field of Classification Search ............. 353/10, 353/7, 94, 13, 14; 359/478, 479, 466, 470, 359/471, 472, 473, 475, 476, 477, 629, 630, 359/458, 454, 455
See application file for complete search history.

(56) References Cited

U.S. PATENT DOCUMENTS

| | | | | |
|---|---|---|---|---|
| 3,324,760 A | * | 6/1967 | Collender .................... 353/10 |
| 3,447,854 A | * | 6/1969 | Minter ........................ 359/464 |
| 5,726,800 A | * | 3/1998 | Ezra et al. ................. 359/466 |
| 6,042,235 A | * | 3/2000 | Machtig et al. .............. 353/28 |
| 6,481,851 B1 | * | 11/2002 | McNelley et al. ............ 353/28 |
| 6,511,182 B1 | * | 1/2003 | Agostinelli et al. .......... 353/7 |

FOREIGN PATENT DOCUMENTS

| JP | A-5-147456 | 6/1993 |
|---|---|---|
| JP | A-2001-356298 | 12/2001 |

OTHER PUBLICATIONS

Office Communication dated Apr. 7, 2006 issued from Chinese Patent Office for counterpart application of 2004100575950 and its English translation.

* cited by examiner

*Primary Examiner*—William C. Dowling
(74) *Attorney, Agent, or Firm*—Posz Law Group, PLC

(57) ABSTRACT

A virtual image display apparatus comprises a pair of optical projection systems, each having a display device, a light source and a projection lens. The images formed on the display device are projected to an image location optical system, which comprises a light collecting lens and an optical diffusion device. The light rays from the optical projection systems are reflected at a translucent reflecting means, so that the light rays are respectively collected at right and left eyes of an observing person. As a result, the images can be recognized by the person as a virtual image in the distance. Since the optical diffusion device diffuses the light rays, in such a way that the light rays to one of observing eyes may not reach the other observing eye, so that the image information of the respective light rays can be recognized by the observing person, without causing a cross-talk.

28 Claims, 12 Drawing Sheets

VIRTUAL IMAGE DISPLAY APPARATUS

CROSS REFERENCE TO RELATED APPLICATION

This application is based on Japanese Patent Application No. 2003-298322 filed on Aug. 22, 2003, the disclosure of which is incorporated herein by reference.

FIELD OF THE INVENTION

This invention relates to a virtual image display apparatus, which makes visible a virtual image on a translucent reflecting means from observing points by reflecting image information projected from an optical unit on the translucent reflecting means and overlapping the virtual image to a foreground.

The virtual image display apparatus of this kind is generally used in a display system, in which an additional image is displayed as a virtual image on a monitor in front of an observing person and the additional image is overlapped to an image or already displayed on the monitor or a forward landscape, and in particular used as an information display apparatus for an entertainment apparatus such as a computer game or an automobile.

BACKGROUND OF THE INVENTION

It is desirable to increase a perspective feeling of the image on the monitor, by changing an image distance of the virtual image. For example, in the case that an image information relating to a forward landscape will be displayed as the virtual image, wherein the image information is overlapped to the forward landscape, the image can be recognized without uncomfortable feeling and a more realistic feeling can be obtained when the image distance of the virtual image is changed depending on a distance between the observing person and the landscape in the display device.

More exactly, when the distance between the observing person and the landscape in the monitor device is longer, the distance between the observing person and the virtual image to be displayed on the monitor device will be likewise made longer, so that the more realistic feeling can be obtained.

An advantage of displaying the virtual image as an additional image is more clearly understood when compared with an ordinary stereoscopic television, with which the perspective feeling can be also obtained.

The ordinary television has an outer frame outside of a display area, and therefore eyes of the observing person are likely focusing on the outer frame. In this situation, when a distance of a display image is largely changed, it may give an uncomfortable feeling to the observing person.

Accordingly, the stereoscopic television may display such an image, which provides a less perspective feeling. On the other hand, when an additional image is displayed as a virtual image, the image distance can be dynamically changed, because the outer frame of a display device can be little recognized.

In a conventional virtual image display apparatus, an image on a display device is magnified by a concave mirror or a lens and displayed as a virtual image, wherein optical devices are mechanically moved to change the image distance.

In another conventional virtual image display apparatus, such a system having an optical projection system and a field lens is disclosed, wherein there are provided with a pair of optical projection systems and images at exit pupils of the projection lenses are formed at right and left eyes of an observing person, namely light rays from the optical projection systems are focused at the right and left eyes.

For example, those conventional apparatus is disclosed in Japanese Patent Publication (Un-examined) H5-147456 or 2001-356298.

In the case that the image distance is changed by mechanically moving the optical devices, a large-sized screen is necessary or the optical system itself becomes larger when the image distance is made longer.

In the case that the conventional virtual image display apparatus is used to an automobile and a front windshield is used as a translucent reflecting means, curvatures of the windshield largely vary and as a result the image on the windshield is largely deformed.

Furthermore, in the conventional apparatus having a pair of optical projection systems and a field lens, wherein the light rays from the respective optical projection systems are collected at the left and right eyes by the use of the field lens, an optical axis of the pair of projection systems is displaced from an optical axis of the field lens, causing an aberration. As a result, the light rays from the whole area of the lens may not be collected at one observing point, so that the whole image can not be recognized by the observing person, causing a hiatus of the image. Furthermore, when the displayed image is made larger, the field lens must be made larger, and thereby the aberration becomes inevitably much larger, decreasing the visibility.

Even if the lens without aberration was realized, the hiatus of the image may easily happen when the observing points, (eyes) of the observing person are moved even by a small distance, because a focusing point is within a small area. Accordingly, even when a position of the observing points is detected to control the light rays, it is difficult to obtain a high visibility.

It is, therefore, necessary to make larger a diameter of the light flux at the focus point, by making larger an exit pupil of a projection lens. When the exit pupil is made larger, however, a distance between the projection lens and the field lens, namely projection distance, becomes larger, resulting in a large sized optical system.

As above, there are many problems in the conventional apparatuses, namely an optical system becomes larger in case that the some of the optical devices of the system is mechanically moved, a visibility is decreased (a hiatus of image) because of the aberration of lens, and an optical system becomes larger in case that an exit pupil is made larger.

SUMMARY OF THE INVENTION

The present invention is made in view of the above problems, and it is an object of the present invention to provide a virtual image display apparatus, which is smaller with a simpler structure and which realizes an image display of a high quality.

According to one of features of the present invention, a virtual image display apparatus comprises; an optical unit for projecting image information; and a translucent reflecting means for reflecting the image information from the optical unit, so that the image information can be recognized by an observing person at its observing points (eyes) as a virtual image, wherein the image information are overlapped in the distance.

The optical unit comprises; a pair of optical projection systems, each having a display device for displaying an image thereon, a light source for illuminating the display device and a projection lens for projecting the image of the display device, wherein the pair of optical projection systems projects the respective images corresponding to right and left eyes of the observing person; and an image location optical system arranged at an image focus location at which the respective images from the pair of optical projection systems are formed.

The image location optical system comprises; an optical device for forming a conjugated relation between an exit pupil of the projection lens and the observing points of the observing person; and an optical diffusion device for diffusing light rays to an extent that the light rays to one of the observing points may not reach the other observing point.

According to another feature of the present invention, an optical magnifying device can be added to the above apparatus, so that the apparatus can be further made smaller.

According to a further feature of the present invention, a detecting means can be provided for detecting the position of the observing eyes to adjust the light rays to be collected at the observing eyes.

According to a further feature of the present invention, a single set of optical projection system can be provided, wherein images are displayed on a display device in a time-sharing manner, and separated to the respective images for the left and right eyes, so that the same effect to the apparatus having the pair of optical projection systems can be obtained.

According to a further feature of the present invention, an optical combining device is provided for combining the respective images from the pair of optical projection systems, and the combined images are reflected by the translucent reflecting means, so that the virtual image of the high quality can be obtained without using an optical diffusion device.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

The present invention will be explained below with reference to the embodiments.

Figure 1:
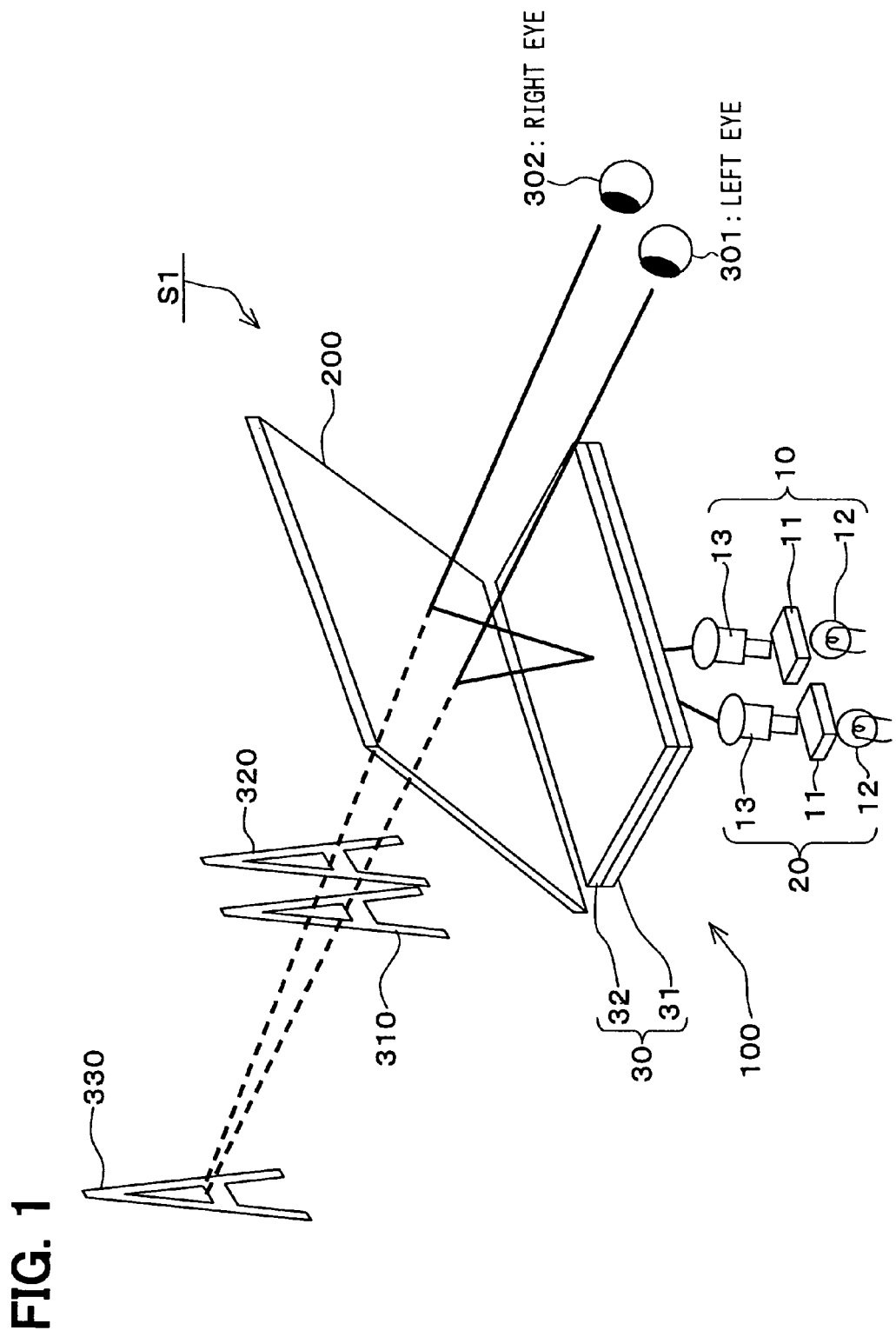
FIG. 1 is a schematic view of a virtual image display apparatus according to a first embodiment of the present invention.

In FIG. 1, showing a schematic structure of a virtual image display apparatus S1 according to a first embodiment of the present invention, an image information projected from an optical unit 100 is reflected by a translucent reflecting plate 200 so that the image information becomes visible to an observing person as a virtual image from its observing points (eyes) 301, 302, wherein the virtual images are overlapped to each other in the distance.

Figure 2:
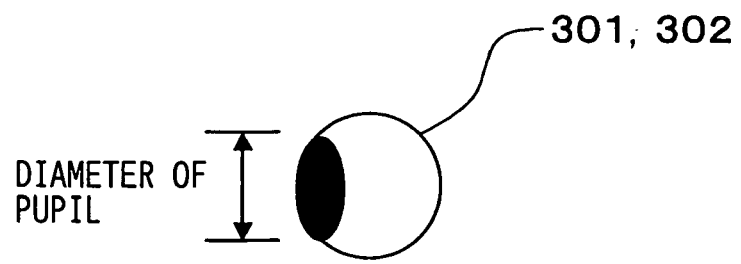
FIG. 2 is a view of an observing point (eye) of an observing person shown in FIG. 1.

FIG. 2 shows an eye (301, 302) of the observing person, wherein a black portion corresponds to a pupil of the eye, and a length of the black portion is a diameter of the pupil.

The optical unit 100 comprises a pair of optical projection systems, namely an optical projection system 10 for a left eye 301 and an optical projection system 20 for a right eye 302.

Each of the optical projection systems 10, 20 has a display device 11 for an image display, a light source 12 for illuminating the display device 11 and a projection lens 13.

The optical unit 100 further comprises an image location optical system 30, which is arranged at such a position (an image focus location) where the images of the pair of optical projection systems 10, 20, namely the respective images of the display devices 11 will be formed on the image location optical system 30 through the projection lenses 13.

The image location optical system 30 is a group of lenses being composed of Fresnel lens 31 for collection of light and micro lens array 32.

The Fresnel lens 31 for light collection is an optical device, by which a projection eye of the projection lens 13 and the observing points 301, 302 of the observing person becomes in a conjugated relation. And therefore, the lens 31 has a function as a screen at which the images of the display devices 11 are projected, in addition to a function of collecting lights.

The micro lens array 32 has a function as an optical diffusion device for diffusing light rays from the optical projection systems 10, 20 to such extent that the light rays to one of the eyes 301, 302 may not reach the other eye.

The group of lenses 30 is arranged at the image focus location at which the images of the display devices 11 projected through the projection lenses 13 are formed, and the displayed images thus formed by the projection lenses 13 are reflected by the half mirror 200, which is the translucent reflecting plate, so that the displayed images are reflected as virtual images on a side of the half mirror 200 opposite to the observing eyes 301, 302. The half mirror has a function of transmitting a part of light rays and reflecting the other part of the light rays.

As shown in FIG. 1, the observing person recognizes the respective virtual images 310, 320 for the left and right eyes 301, 302 as the virtual image of the stereoscopic vision, at such a visible position 330 which is further ahead of the virtual images 310, 320 from the half mirror 200 and at which two of the virtual images 310, 320 are fused. As a result, the observing person can recognize it as the image having perspective by the binocular parallax.

As above, there are two optical projection systems 10, 20 respectively for the left and right eyes 301, 302. A visible distance between the observing points (eyes) 301, 302 and the visible position 330 recognized by the observing person can be changed by moving the virtual images 310, 320 of the optical projection systems 10, 20, namely by moving the displayed images on the display devices 11 in a horizontal direction.

For example, when the virtual images 310, 320 are moved to further separate in the horizontal direction, the observing person recognizes the image in a longer distance, and vice versa.

Accordingly, it is an advantage in that the observing person can recognize the virtual image with a depth perception through the perspective by parallax. This advantage decreases loads of the system, because the visible distance can be changed by simply moving the displayed images on the display devices 11 without moving the lens and mirror in a direction of its optical axis.

As explained above, the exit pupil of the projection lens 13 and the observing points 301, 302 of the observing person are in a conjugated relation, with respect to the Fresnel lens 31 of the group of lenses 30 (the image location optical system).

An optical path length "a" between the projection eye of the lens 13 and the Fresnel lens 31, an optical path length "b" between the Fresnel lens 31 and the observing points 301, 302 of the observing person, and a focal length "f" of the Fresnel lens 31 are in the following relational expression. (please see FIG. 6)

$$1/a + 1/b = 1/f$$

In this formula, when the optical path length "b" between the Fresnel lens 31 and the observing points 301, 302 is calculated, the reflection of light rays at the half mirror 200 is taken into consideration.

If there were no aberration in the Fresnel lens 31, all of the lights passing through the projection eyes of the lenses 13 would be collected on the observing points 301, 302, because of the conjugated relation. Accordingly, there would be no waste of lights and thereby brightness of the display apparatus could be increased.

In reality, however, there is existing aberration in the Fresnel lens 31. And if the Fresnel lens 31 were made larger to enlarge the display image, the aberration of the lens 31 would be correspondingly increased.

Figure 4:
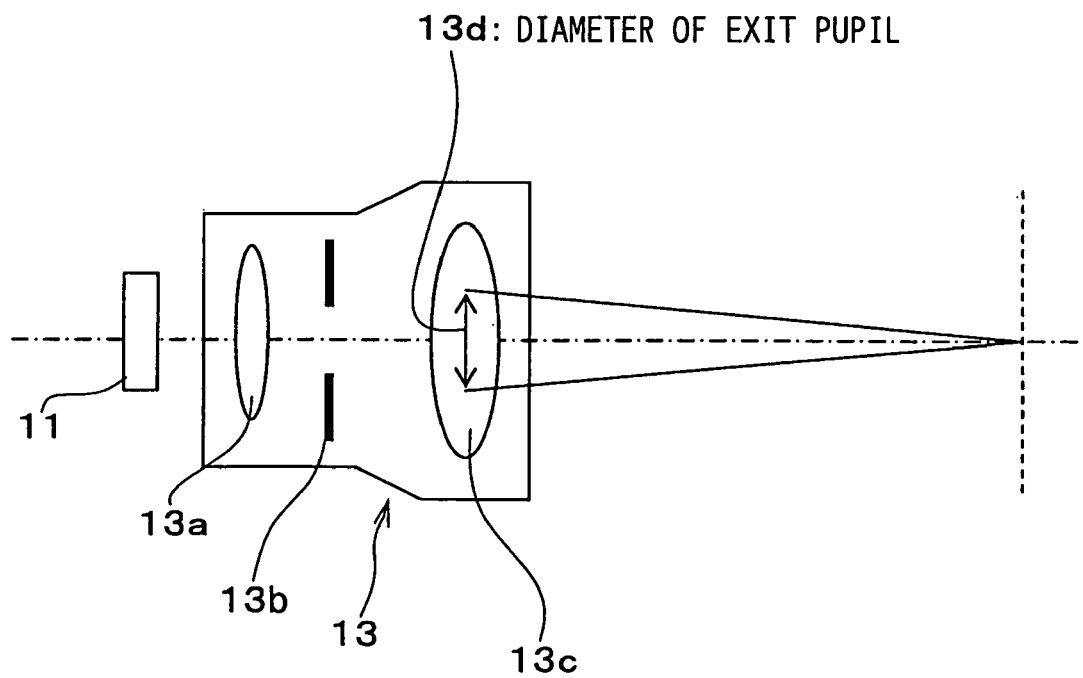
FIG. 4 is a view for explaining an exit pupil of a projection lens.
Figure 3:
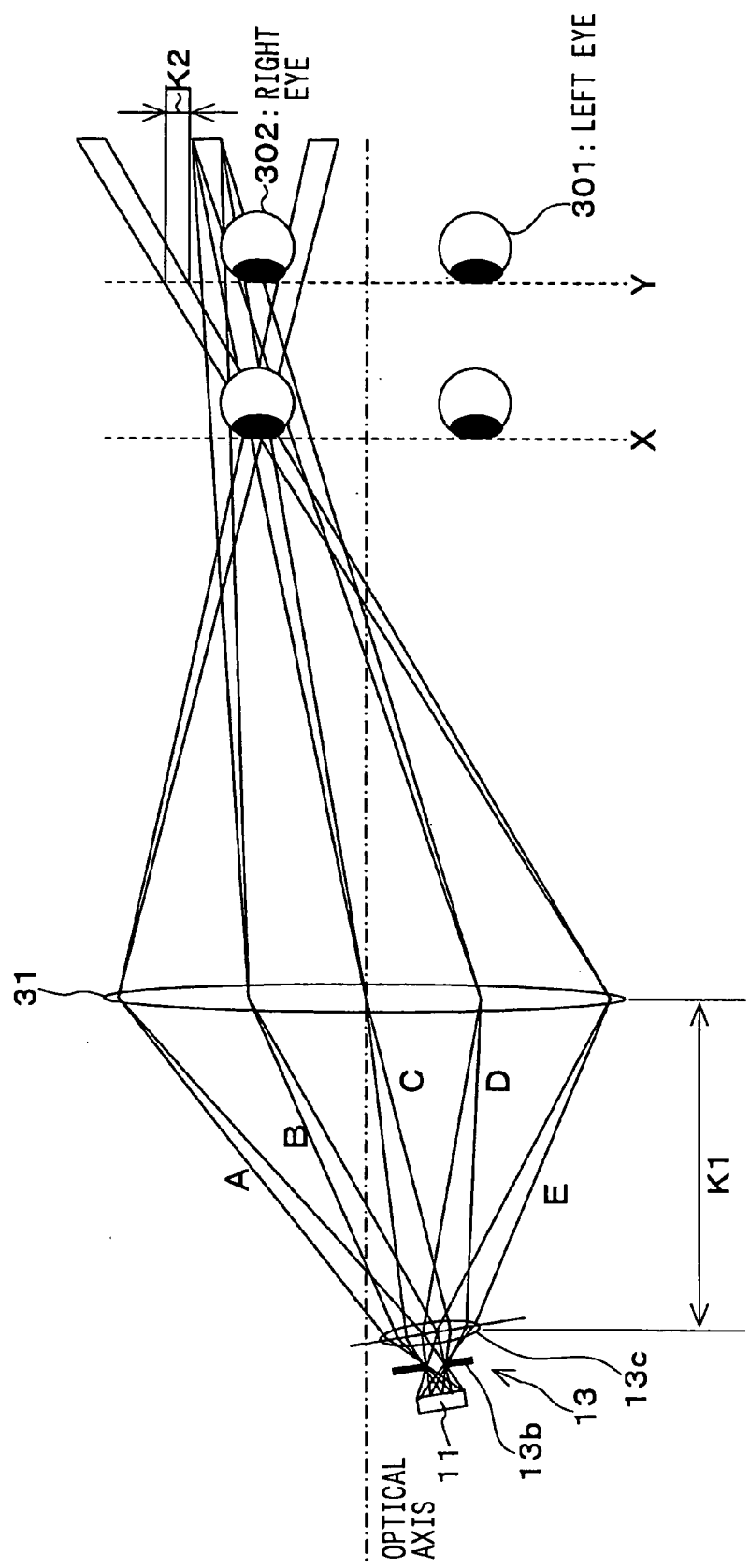
FIG. 3 is a schematic view showing light rays from a light source to the observing points in the apparatus of FIG. 1, when viewed from above, wherein a half mirror and a micro lens array are omitted.

In this connection, the explanation is further made with reference to FIGS. 3 and 4. FIG. 3 is a schematic view showing the optical projection system 20, the lens 31 and the observing points 301, 302, when viewed from a position above the observing person, wherein the half mirror 200 and the micro lens array 32 are omitted. FIG. 4 is a schematic view showing the exit pupil of the projection lens 13.

As shown in FIG. 4, the projection lens 13 comprises a rear lens 13a, a stop 13b and a front lens 13c. An apparent aperture of the projection lens 13, namely an apparent size of the stop 13b when viewed from the outgoing side, is the exit pupil. In FIG. 4, a diameter 13d of the exit pupil is indicated in the front lens 13c.

As shown in FIG. 3, a point, at which the image of the projection eye is formed through the Fresnel lens 31, corresponds to a focus point. Accordingly, a diameter K2 of light flux at the focus point depends on the diameter 13d of the exit pupil.

When a distance K1 between the projection lens 13 and the lens 31 will be shortened to make the optical system smaller as a whole, a wide-angle projection lens 13 becomes necessary. When the wide angle becomes larger, the exit pupil becomes smaller and thereby the diameter K2 of the light flux at the focus point becomes smaller.

Thus, there exists a trade-off relation between the miniaturization of the optical system and the increase of the diameter K2 of the light flux at the focus point by making larger the projection eye.

As is also shown in FIG. 3, the focus points differ from each other depending on passing points at the lens 31 due to the aberration of the lens 31. For example, the light rays B, C and D passing through the lens 31 at points close to the center of the lens 31 will be collected on a position far from the lens 31, while the light rays A and E passing through the lens 31 at points around edge of the lens will be collected on a position closer to the lens 31.

In the case that the observing points 301, 302 are positioned at a position X, the light rays A, C and E reach the right eye 302 of the observing person. As a result, the observing person can only partly recognize the image, which covers the image of the center and edge. The other doughnut-shape portions of the total image can not be recognized by the observing person.

In the case that the observing points 301, 302 are positioned at a position Y, the light rays C and D reach the right eye 302 of the observing person. The image of edge portion can not be recognized by the observing person.

As above, hiatus of the image at the observing points may occur. This is because the respective focus points passing through the Fresnel lens 31 at different points differ from each other due to the aberration of the lens (coma in this case), and because the diameter of the light flux is small and thereby there are some light flux which may not reach the eyes of the observing person depending on the position of the observing points.

Figure 5:
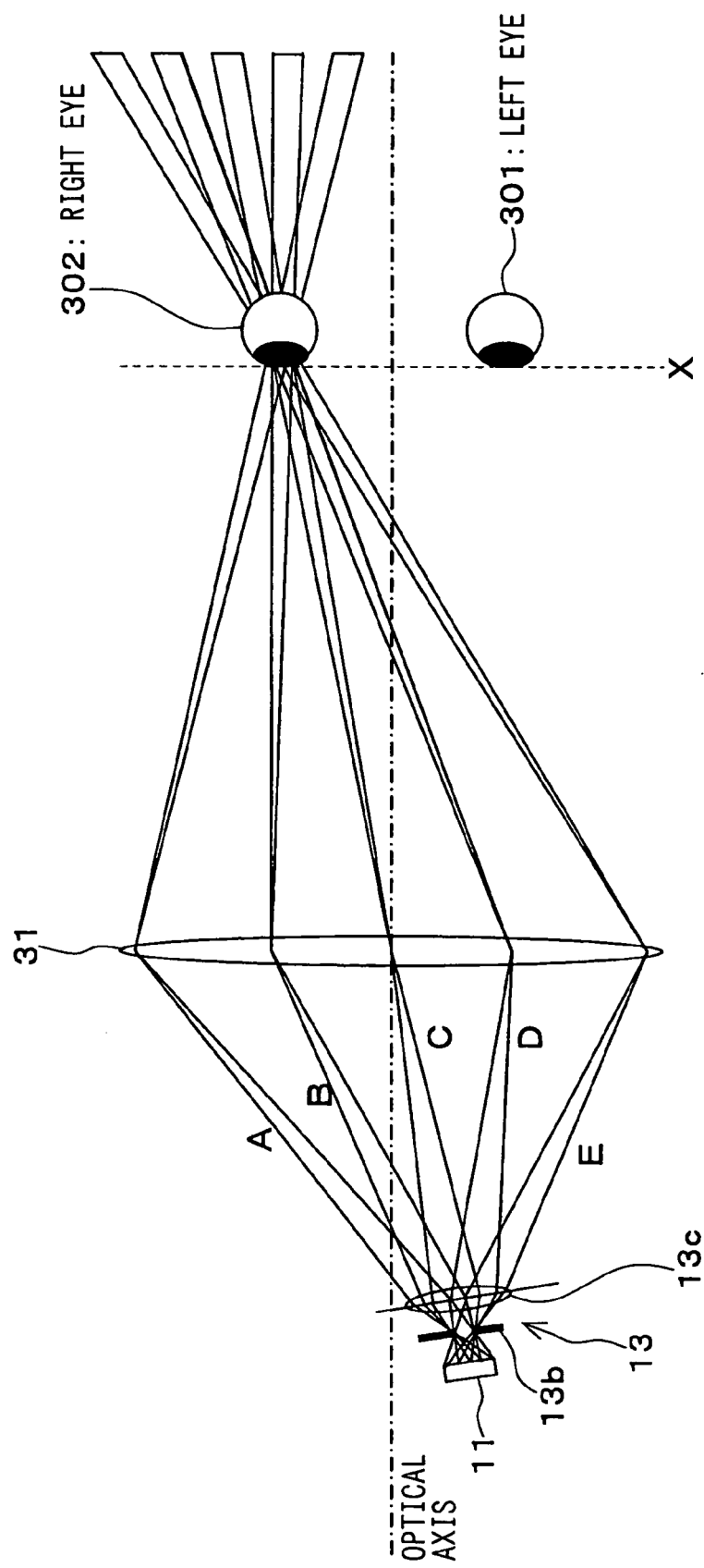
FIG. 5 is a schematic view, similar to FIG. 3, wherein the light rays are shown in the case that no aberration of the lens is existing.

FIG. 5 is a schematic view showing the case in which no aberration is existing in the Fresnel lens 31. As shown in FIG. 5, the respective light rays passing through the different points of the lens 31 can be collected on one focus point. It is, however, disadvantageous in this case in that when the observing points of the observing person's pupil is displaced even by a small distance, the image can not be recognized. This is because the diameters of the respective light fluxes are small and the diameter of the pupil is also small.

A sophisticated control would be necessary when the position of the observing points will be detected and the position of the focus points will be changed depending on the detected position of the observing points, to overcome the above mentioned disadvantage. It is, however, not practical in view of the cost and size of the apparatus. In addition, it costs high to remove the aberration of lens, because it would require a lot of lenses.

Accordingly, the micro lens array 32 is used in the present invention as the optical diffusion device. Since the light rays can be diffused by the micro lens array 32, depending on curvatures of the lens, hiatus of the image at the observing points can be prevented.

Figure 6:
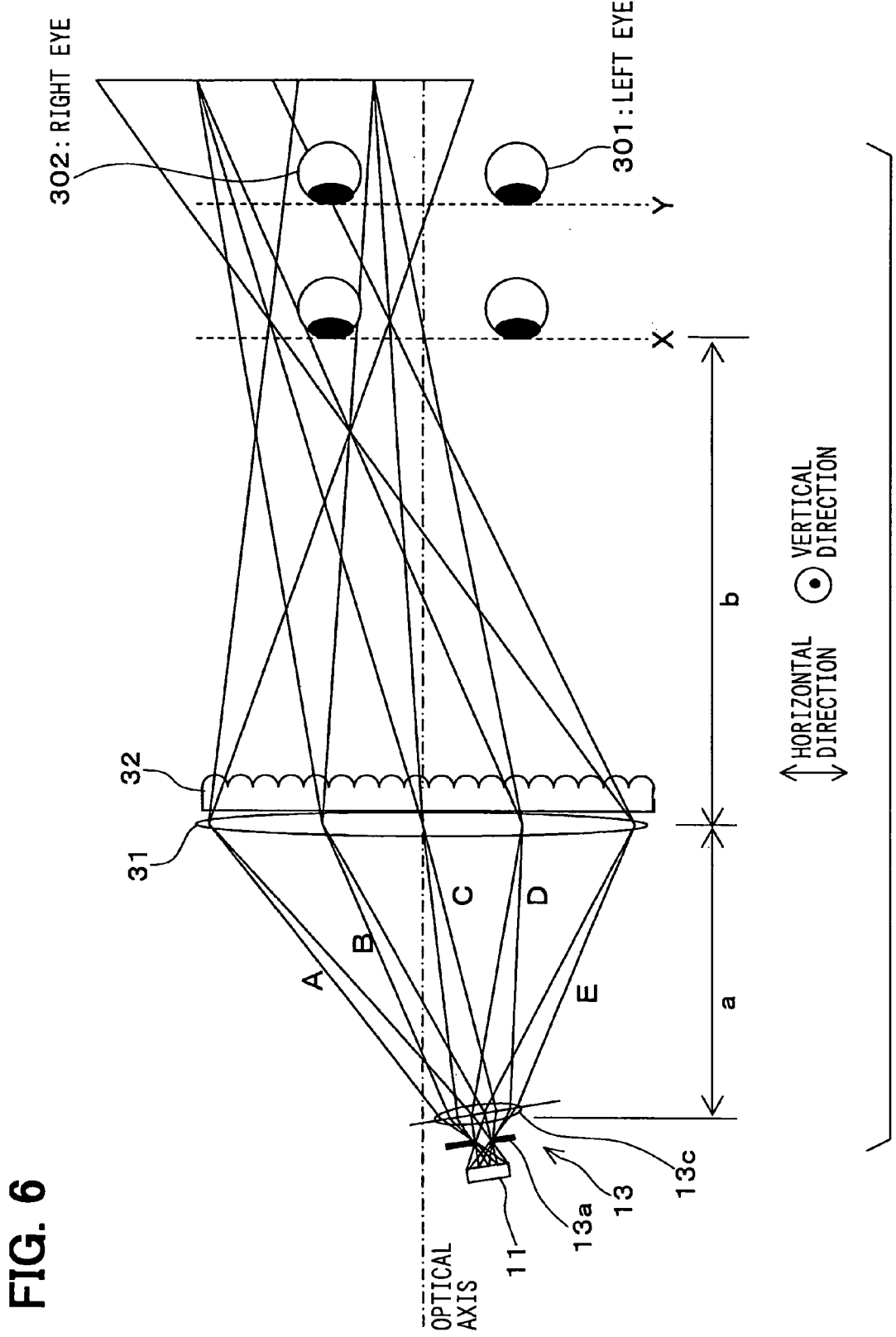
FIG. 6 is a schematic view for explaining an optical principle for the first embodiment shown in FIG. 1.

FIG. 6 is a schematic view showing an optical principle of the virtual image display apparatus S1 according to the present invention. When compared with FIG. 3, the micro lens array 32 is added in FIG. 6.

As mentioned above, the micro lens array 32 has a function of diffusing the light rays depending on the lens curvature, and thereby the light flux can be enlarged. All of the light fluxes passing through the Fresnel lens 31 can be enlarged by the micro lens array 32, so that all of the light rays A to E can reach the observing point 302. As a result, the hiatus of the image at the observing point can be prevented.

As understood from FIG. 6, the complete image can be recognized by the observing person at the positions X and Y. This means that a visible area is expanded in the optical axis. If the light rays for the right eye would reach the left eye, or the vice versa, so-called a cross talk would occur.

When the curvature of the micro lens array 32 is adjusted in the horizontal direction so that the cross talk may not occur, the hiatus of the image and the cross talk can be prevented at the same time.

When the curvature of the micro lens array 32 in the vertical direction is made smaller than that in the horizontal direction, the diffused degree in the vertical direction is larger than that in the horizontal direction. As a result, it is not necessary to control the light rays in the vertical direction in response to the movement of the observing points in the vertical direction.

In the case that the observing points are moved in the horizontal direction, however, it is necessary to control the light rays when the observing points are moved more than a half of a pupil distance. An apparatus for controlling the light rays in response to the movement of the eyes in the horizontal direction will be explained.

Modification of First Embodiment

Figure 7:
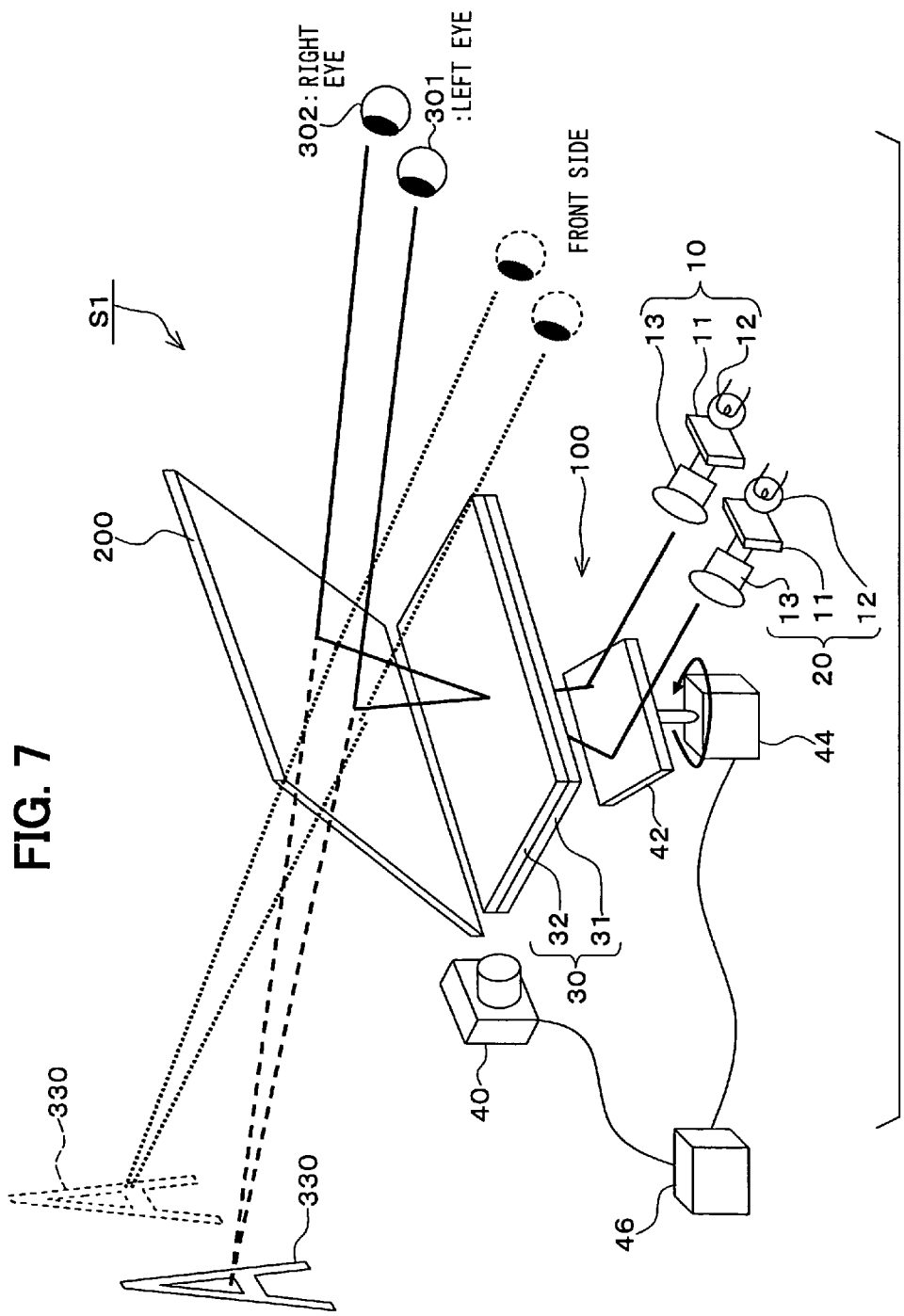
FIG. 7 is a schematic view of a modification of the first embodiment, wherein a detecting means for detecting position of the observing points is provided.

FIG. 7 is a schematic view of the apparatus which is a modification of the virtual image display apparatus of FIG. 1, wherein a camera 40 for detecting the positions of the observing eyes, and a mirror 42 to be rotated by an electric motor 44 are added. The camera 40 is composed of CCD sensors and the image information of the CCD sensors are analyzed by an electronic control unit 46.

The image of the observing person is taken by the camera 40 and analyzed by the control unit 46 to identify the position of the observing points 301, 302. Then an angle of rotation for the mirror 42 will be calculated by the control unit 46 and rotated by the electric motor 44, so that the light rays from the optical projection systems 10, 20 respectively reach the left and right observing points 301, 302.

Accordingly, even when the observing person moves in the horizontal direction, and thereby the observing points 301, 302 are displaced, the image can be recognized. FIG. 7 shows, as an example, the case in that the observing points 301, 302 are moved in the rightward direction.

As in the modification shown in FIG. 7, the mirror 42 is interposed in the optical path from the light source 12 to the half mirror 200, and the light rays are deviated, so that the optical system can be reduced in size as a whole.

In case of FIG. 1, in which the mirror 42 is not used, the vertical length of the apparatus is inevitably large, whereas the vertical length of the apparatus of FIG. 7 can be made smaller with the use of the mirror, which is particularly preferable when the apparatus is used for an automobile.

When the light rays are deviated, deformation of the image to be displayed may happen. Namely, when the incident angle of the light to the group of lenses 30 is inclined by the rotation of the mirror 42, the image to be displayed will be deformed.

Furthermore, in the case that the apparatus of this kind is used for the automobile, wherein a front glass (windshield) of the automobile is used as the translucent reflecting plate (half mirror) 200, the deformation of the image may be further generated by the curvature of the front glass (windshield).

The image in a good condition (without deformation) can be, however, obtained when the display image for the display device 11 is deformed in advance, so that the deformation may amend the deformation to be generated at the deviation of the light rays.

According to the embodiment as described above, there are following advantages.

The optical system can be prevented from becoming larger in size, because the visible distance between the observing points 301, 302 and the visible position 330, at which the virtual image is recognized by the observing person, can be changed by moving the positions of the displayed images on the display devices 11 formed by the pair of optical projection systems 10, 20. Namely, according to this embodiment, the optical devices may not be physically moved.

Since the image location optical system (the group of lenses) 30 has the optical device (Fresnel lens) 31, so that the exit pupil of the projection lens 13 and the observing points 301, 302 of the observing person are in the conjugated relation, all of the light rays passing through the exit pupil of the projection lens 13 can be collected at the observing points of the observing person and thereby the display image can be made brighter.

Furthermore, the image location optical system 30 has the optical diffusion device 32, according to which the light rays are diffused to such a degree that the light rays to one of the observing points may not reach the other observing point. As a result, the diameter of the light flux at the focus point can be made larger to such extent that the light rays to one of the observing points may not reach the other observing point, without making larger the projection eye of the projection lens 13.

Namely, the hiatus of the image can be prevented even when there is the aberration of the lenses, and then the decrease of the visibility can be suppressed. In addition, it is not necessary to control the light rays in response to the movements of the observing points.

As above, according to the embodiment, the optical device can be made smaller with a simpler structure, and at the same time the image of high quality can be obtained.

In the above embodiment, the micro lens array 32 is used as the optical diffusion device, wherein the curvature of the micro lens array 32 in the vertical direction is preferably made smaller than that in the horizontal direction.

As already explained, in case of the optical diffusion, it is necessary to prevent the cross talk, so that the light rays to one of the observing points may not reach the other observing point. This means that there is a certain limit for the curvature of the optical diffusion device in its horizontal direction.

On the other hand, there is little limitation for the diffusion in the vertical direction, because the right and left eyes of the human being are arranged in the horizontal direction. This is the reason why the curvature of the optical diffusion device in the vertical direction can be made smaller. As a consequence thereof, the tracking of the observing points in the vertical direction is not necessary in most cases.

As is also explained in the modification of the first embodiment, it is preferable in view of downsizing the optical system to deviate the light rays at the mirror 42, which is disposed in the optical path from the light source 12 to the half mirror 200.

In the above modification, the camera 40 for detecting the positions of the observing points 301, 302, and the mirror 42 as well as the electric motor 44 for controlling the light rays to the observing points are provided. Since the mirror 42 is arranged to rotate in the horizontal plane, the tracking of the observing points in the horizontal direction can be done in a preferable manner.

Further, in the above modification, the images displayed on the display devices 11 are in advance deformed, so that the deformed images on the reflecting half mirror 200, which are formed thereon by the optical projection systems 10, 20, can be amended to obtain the images of the high quality.

Second Embodiment

Figure 8:
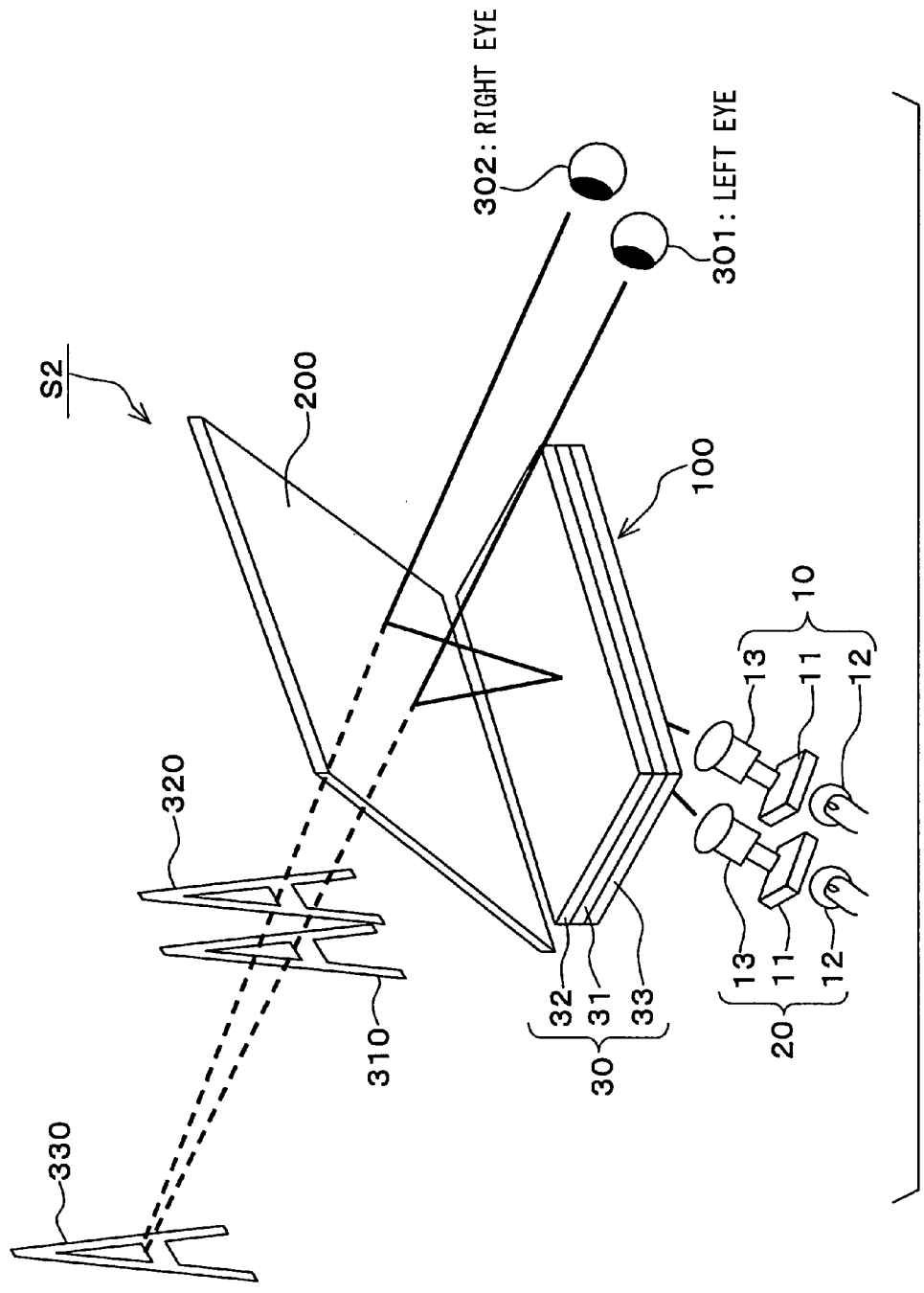
FIG. 8 is a schematic view showing a virtual image display apparatus according to a second embodiment of the present invention.

FIG. 8 is a schematic view of a virtual image display apparatus S2 according to a second embodiment of the present invention, wherein a prism sheet 33 is added to the image location optical system 30 of the apparatus S1 shown in FIG. 1.

In FIG. 8, the prism sheet 33 is provided in the group of lens (the image location optical system) 30, wherein the prism sheet 33 is in contact with the Fresnel lens 31. The light rays are refracted by the prism sheet 33.

The prism sheet 33 here is an optical device being composed of stripe shaped microscopic prisms and having a function of refracting the light rays. It becomes possible with this prism sheet 33 to incident the light rays from the optical projection systems 10, 20 in a direction, which is inclined with respect to a surface of the group of lenses 30.

In this prism sheet 33, an angle (an exit angle) of outgoing light ray is made smaller than an incident angle of the light rays from the optical projection systems 10, 20, so that an effect of the lens for refracting the light rays can be appropriately obtained.

As a result, the optical projection systems 10, 20 can be arranged at positions much closer to the group of lenses 30, and thereby a miniaturization of the optical system can be attained. For example, a downsize of the apparatus in the vertical direction is realized in FIG. 8.

Furthermore, the prism sheet 33 is disposed at the position of the image formation, at which the images of the display devices 11 of the optical projection systems 10, 20 are formed, namely in the group of lenses 30 including the Fresnel lens 31. And therefore, an influence of chromatic aberration to be caused by the prism sheet 33 can be eliminated. This effect is attained in this embodiment by forming the Fresnel lens 31, the micro lens array 32 and the prism sheet 33 as one unit. It is, however, not always necessary to form those devices as one unit. The same effect can be obtained when the prism sheet 33 is disposed close to but separate from the group of lenses 30.

As above, the virtual image display apparatus S2 can be obtained, which has an effect of downsizing the apparatus and suppressing the influence by the chromatic aberration with the prism sheet 33, in addition to the effects obtained by the apparatus shown in FIG. 1.

Third Embodiment

Figure 9:
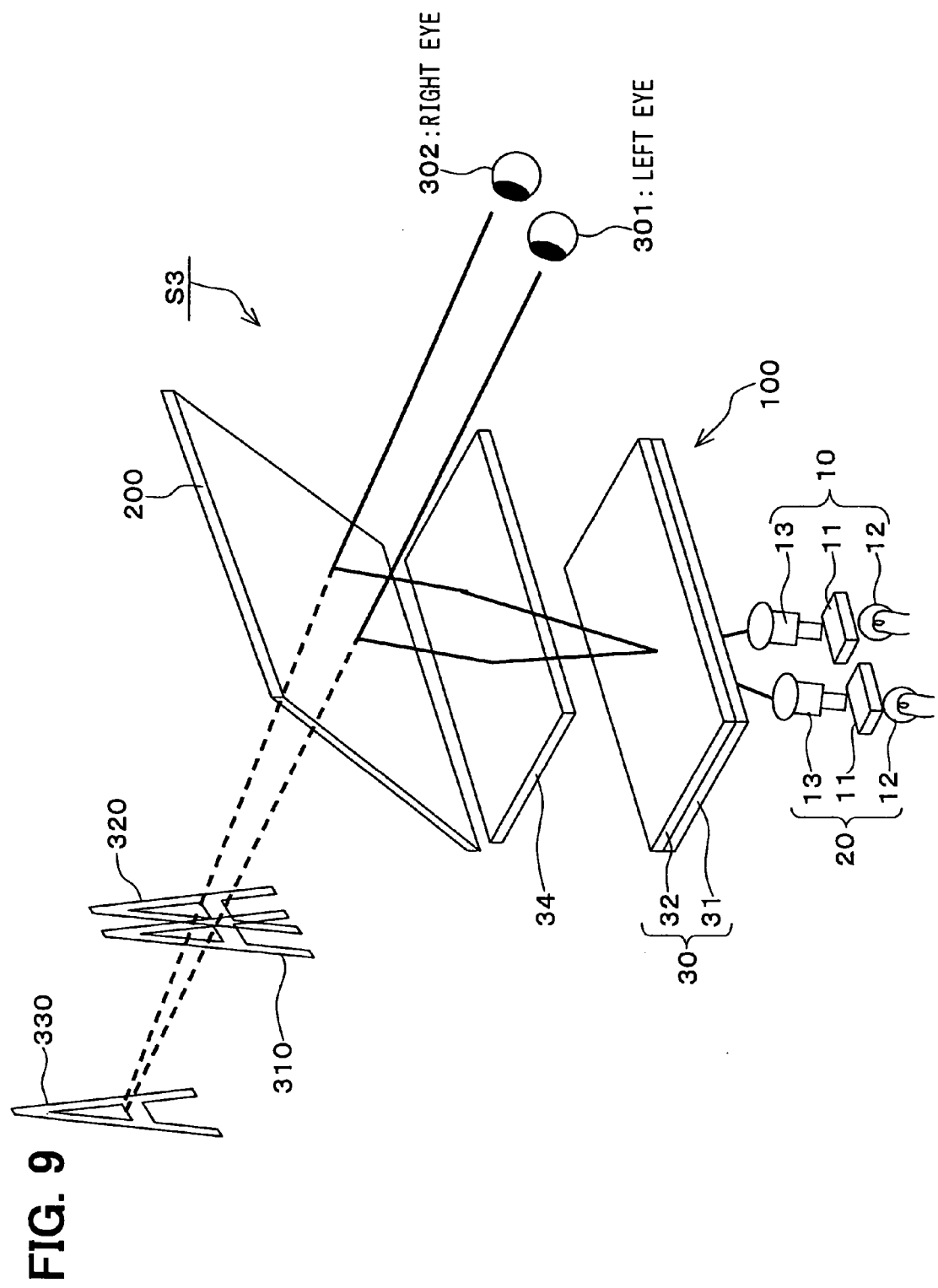
FIG. 9 is a schematic view showing a virtual image display apparatus according to a third embodiment of the present invention.

FIG. 9 is a schematic view of a virtual image display apparatus S3 according to a third embodiment of the present invention, wherein a magnifying Fresnel lens 34 is added to the apparatus S1 shown in FIG. 1.

The magnifying Fresnel lens 34 is arranged at such a position, which is separate from the group of lenses 30 (the collecting Fresnel lens 31 and the micro lens array 32) and closer to the observing person. The lens 34 has a function of magnifying the image on the group of lenses 30.

In the apparatus in FIG. 1, the images of the optical projection systems 10, 20 are formed on the group of lenses 30 and the virtual images thereof are displayed by the half mirror 200. Accordingly, the optical path length from the observing points 301, 302 to the group of lenses 30 corresponds to an image forming length of the virtual image from the observing points 301, 302.

When a visible distance of an image fusing point (the visible position), at which the virtual images 310, 320 for the left and right eyes are fused into one image, is desired to be made longer in the stereoscopic vision by the parallax, the image forming length for the virtual images 310, 320 will be made longer so that the both images are easily fused as the virtual image 330 of the stereoscopic vision.

This is because an uncomfortable feeling of the observing person is decreased as a result of decreasing a difference between a feeling of distance of the observing person when adjusting its convergence of the eyes 301, 302 to look at the parallax images and a feeling of distance at a focus accommodation to accommodate a focus of eyes to a point where the images are formed.

In the above described embodiment, the magnifying Fresnel lens 34 is arranged between the half mirror 200 and the group 30 of lenses comprising the collecting Fresnel lens 31 and the micro lens array 32, so that the images 310, 320 of the optical projection systems 10, 20 formed on the group 30 of the lenses are enlarged and displayed in the distance.

The exit pupil of the projection lens 13 and the observing points 301, 302 of the observing person are in the conjugated relation with respect to the principal point, in the case that the collecting Fresnel lens 31 and the magnifying Fresnel lens 34 are regarded as constituting one unified optical system, and thereby the enlarging of the images in the distance and the light collection are co-existing.

In this embodiment, the collecting Fresnel lens 31 constitutes an optical light collecting (condensing) device, the micro lens array 32 constitutes an optical diffusion device, and the magnifying Fresnel lens 34 constitutes an optical enlarging system for enlarging the images.

The projection eye of the projection lens 13 and the observing points 301, 302 of the observing person are in the conjugated relation with respect to the principal point, in the case that the collecting Fresnel lens 31 and the magnifying Fresnel lens 34 are regarded as constituting one unified optical system.

Fourth Embodiment

Figure 10:
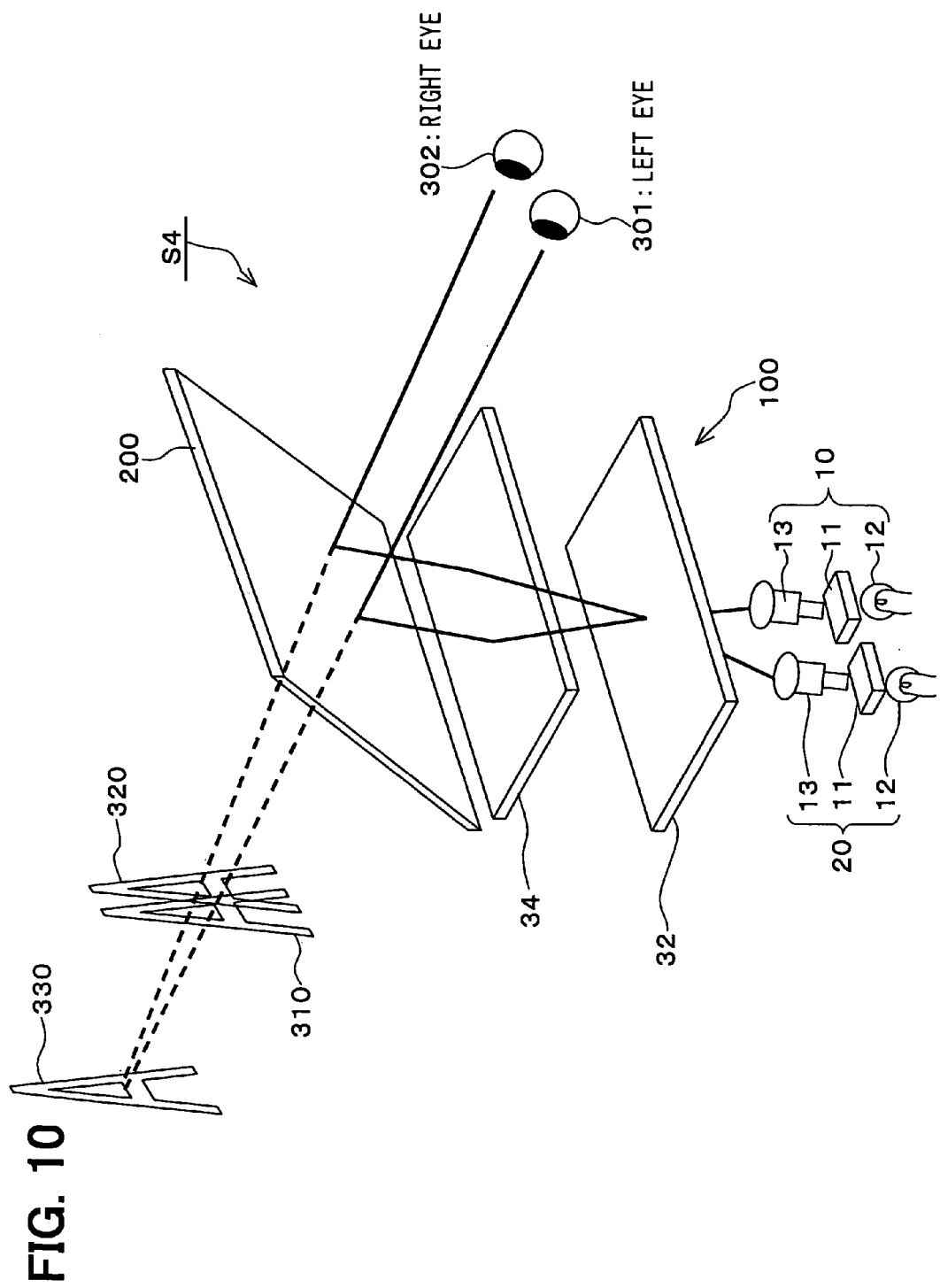
FIG. 10 is a schematic view showing a virtual image display apparatus according to a fourth embodiment of the present invention.

FIG. 10 is a schematic view of a virtual image display apparatus S4 according to a fourth embodiment of the present invention, wherein the Fresnel lens 31 for collecting light is removed from the group 30 of lenses of the apparatus shown in FIG. 9.

Namely, the apparatus S4 of this embodiment comprises the optical projection systems 10, 20 each having the light source 12 and the projection lens 13, the micro lens array 32, the magnifying Fresnel lens 34, and the half mirror 200.

The micro lens array 32 is arranged at the image focus position, at which the images of the pair of optical projection systems 10, 20 will be formed, and functions as the screen.

The magnifying Fresnel lens 34 is arranged at such a position, which is separate from the micro lens array 32 and closer to the observing person, so that the images formed on the micro lens array 32 are enlarged and displayed in the distance.

Furthermore, the magnifying Fresnel lens 34 has a function of collecting the light rays from the optical projection systems 10, 20, and is arranged at such a position that the exit pupil of the projection lens 13 and the observing points 301, 302 of the observing person become in the conjugated relation, with respect to the principal point of the magnifying device 34.

In this embodiment, the micro lens array 32 constitutes an optical diffusion device, and the magnifying Fresnel lens 34 constitutes an optical enlarging system for enlarging the images.

Fifth Embodiment

Figure 11:
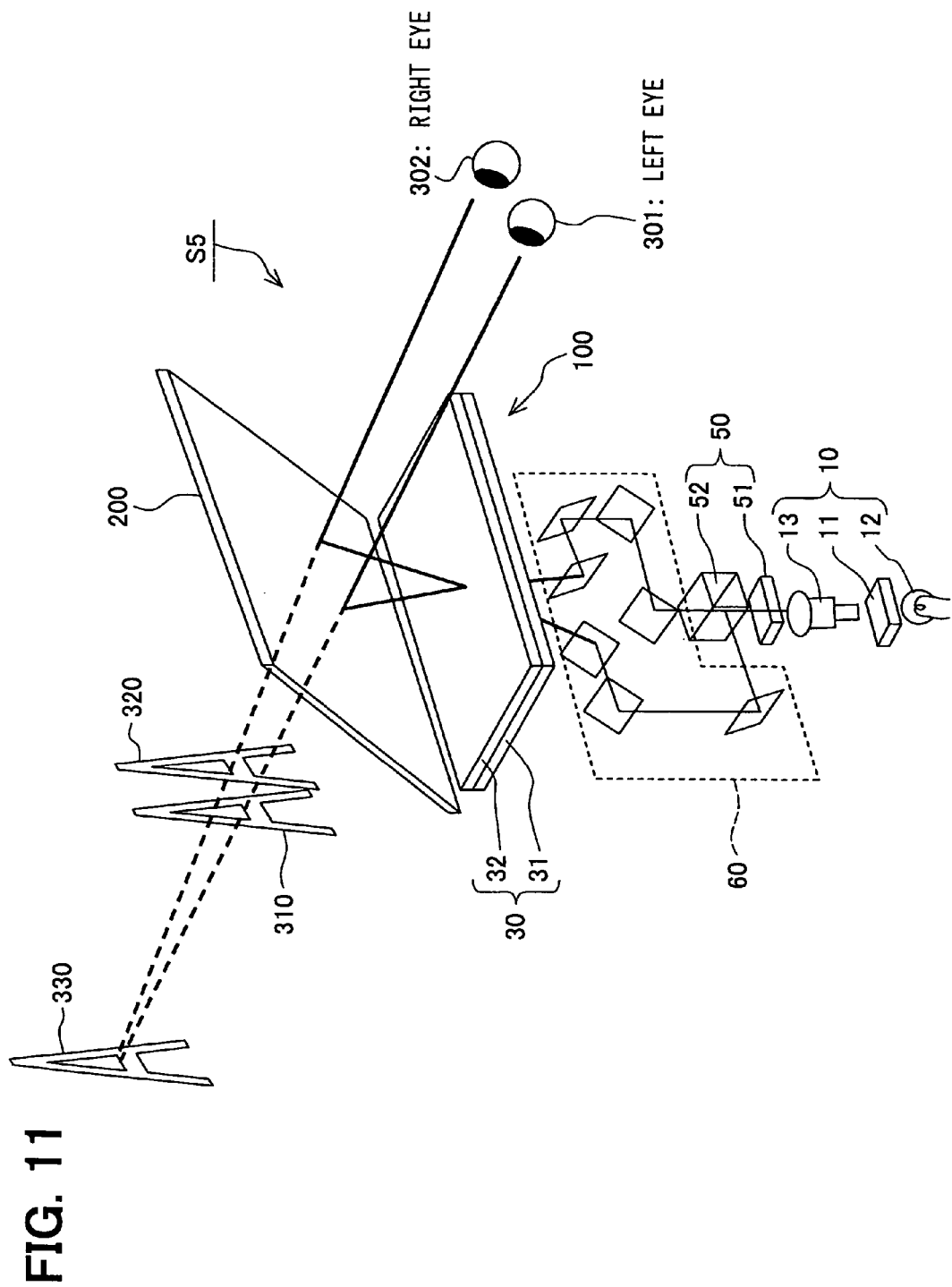
FIG. 11 is a schematic view showing a virtual image display apparatus according to a fifth embodiment of the present invention.

FIG. 11 is a schematic view of a virtual image display apparatus S5 according to a fifth embodiment of the present invention.

The virtual image display apparatus S5 comprises; a single set of optical projection system 10 having a light source 12, a display device 11 and a projection lens 13; an optical image separator 50 having a liquid-crystal shutter 51 and a polarizing beam splitter 52; a group 60 of mirrors for guiding light rays to a group 30 of lenses; an image location optical system 30 (the group of lenses) having a collecting Fresnel lens 31 and a micro lens array 32; and a half mirror 200 for reflecting the light rays.

The liquid-crystal shutter 51 is of a twist-nematic structure, wherein the liquid-crystal is twisted by 90 degrees. Depending on ON and Off of the electrical field, it is switched over from a vertically oriented state to a twisted state, and vice versa.

A polarizing plate (not shown) is provided on an in coming side of the liquid-crystal shutter 51, so that the light rays passing through the shutter 51 will be polarized in the same direction to the polarizing plate in the case that the liquid-crystal is in the vertically oriented state, while the light rays will be polarized in a direction rotated by 90 degrees to the direction of the polarizing plate in the case that the liquid-crystal is in the twisted state. Thus, the polarizing direction of the light rays passing through the shutter 51 can be changed by 90 degrees depending on the ON or OFF state of the electrical field.

The polarizing beam splitter 52 arranged at a backward side of the shutter 51 is an optical device, which reflects or transmits the light rays depending on the polarized direction thereof. For example, it reflects the light rays in case of S-polarization and transmits the light rays of P-polarization.

The respective light rays reflected by and transmitted through the polarizing beam splitter 52 are guided by the group of mirrors 60 and the image on the display device 11 of the optical projection system 10 will be projected to and formed at the group of lenses 30.

Even in this embodiment, the exit pupil of the projection lens 13 and the observing points 301, 302 of the observing person are in the conjugated relation, all of the light rays can be collected at the observing points 302, 302 and thereby the display image can be made brighter.

In this embodiment, the display device 11 is operated in a time-sharing manner to alternately display the respective images for the right and left eyes. The liquid-crystal shutter 51 is also operated in the time-sharing manner, which is synchronized with the operation of the display device 11.

For example, the light rays for the right eye image is projected to the polarizing beam splitter 52 in the form of S-polarization, and then the light rays will be reflected by the polarizing beam splitter 52. On the other hand, the light rays for the left eye image is projected to the polarizing beam splitter 52 in the form of P-polarization, and then the light rays will be transmitted through the polarizing beam splitter 52.

A reflection coefficient at the half mirror 200 differs from the direction of the light rays polarization. It is, therefore, desirable to make the light rays to the half mirror 200, so that a component of S-polarization and a component of P-polarization for the light rays will be equal to each other.

In the above explained embodiment, since the images for the right and left eyes can be respectively projected by the single set of the optical projection system, the miniaturization and cost down of the optical system of the apparatus can be realized.

In this embodiment, the collecting Fresnel lens 31 constitutes an optical light collecting (condensing) device, the micro lens array 32 constitutes an optical diffusion device, and the optical image separator 50 having the liquid-crystal shutter 51 and polarizing beam splitter 52 constitutes an image separating means.

According to the embodiment described above, the images from the single optical projection system 10 can be divided into two images by the optical image separator 50. And therefore, it becomes possible to display the respective images for the right and left eyes of the observing person, as in the same manner to the other embodiments in which two optical projection systems are provided.

In this embodiment, when the respective images to be divided by the optical beam separator 50 are moved, the visible distance of the virtual image, namely the visible position 330 can be changed.

More exactly, the display images alternately formed on the display device 11 in the time-sharing manner, namely the image for the right eye and the image for the left eye are respectively moved. As a result, it is not necessary to physically move the optical devices and thereby the optical system is prevented from becoming larger.

Modification of Fifth Embodiment

In the above embodiment of FIG. 11, a magnifying Fresnel lens 34 can be also added at such a position which is separate from the group of lenses 30 (comprising the collecting lens 31 and the micro lens array 32) and closer to the observing person, so that the images projected from the optical projection systems 10, 20 and formed on the group of lenses 30 are enlarged and displayed in the distance.

In such a modification, the exit pupil of the projection lens 13 and the observing points 301, 302 of the observing person are arranged to be in the conjugated relation with respect to the principal point, in the case that the collecting Fresnel lens 31 and the magnifying Fresnel lens 34 are regarded as constituting one unified optical system.

Further modification of Fifth Embodiment

The collecting Fresnel lens 31 of the group of lenses 30 can be removed from this virtual image display apparatus S5 of this fifth embodiment, as in the fourth embodiment.

In such a case, the virtual image display apparatus S5 comprises; the single set of optical projection system 10 having the light source 12, the display device 11 and the projection lens 13; the optical image separator 50; the group of mirrors 60; the micro lens array 32; a magnifying Fresnel lens 34 having a function of collecting the light and a function of enlarging the image; and the half mirror 200.

Even in the case that the collecting Fresnel lens 31 of the group of lenses 30 is removed, a prism sheet 33 for refracting the light rays can be provided to the micro lens array 32 as the optical diffusion device, as in the above explained second embodiment.

Sixth Embodiment

Figure 12:
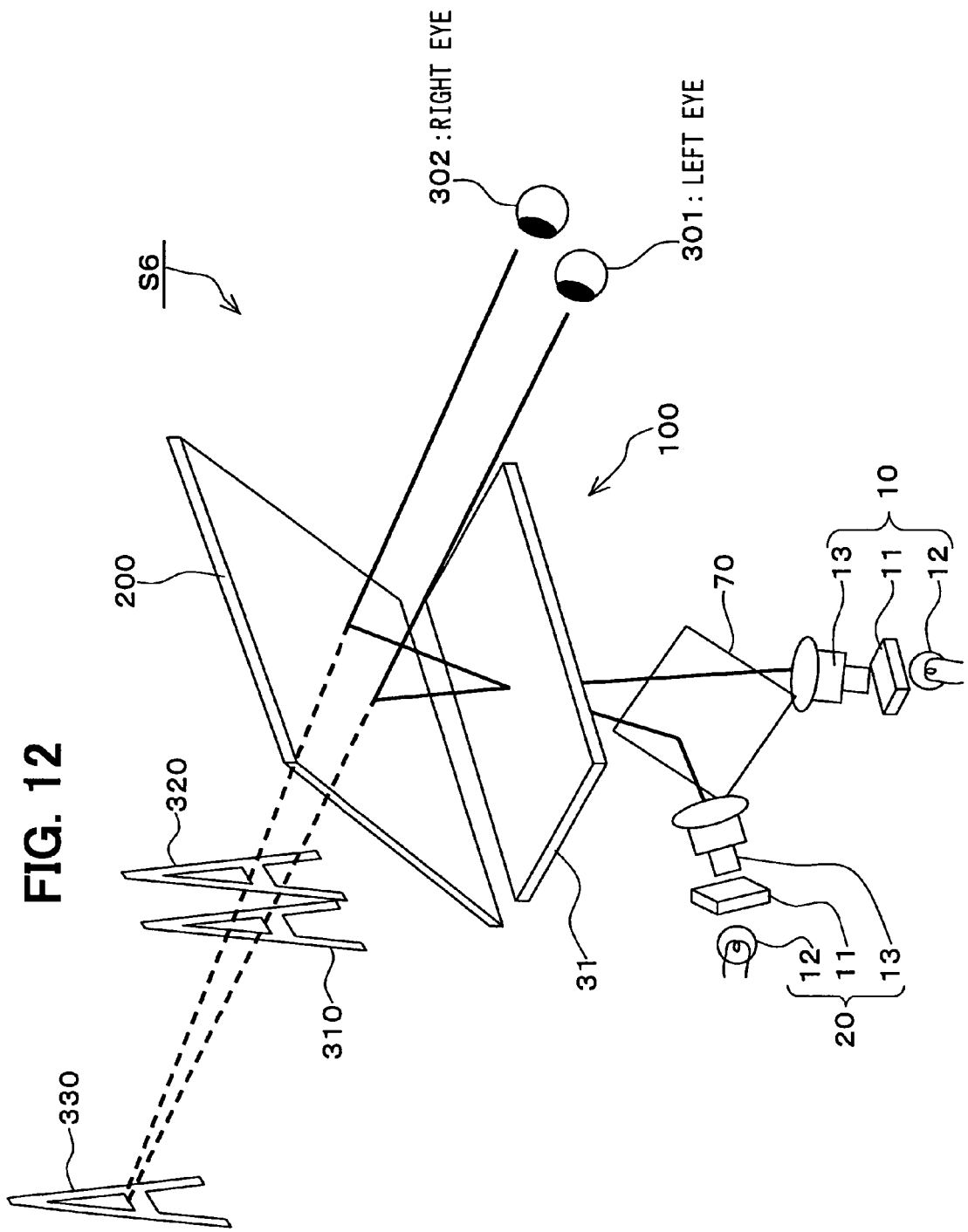
FIG. 12 is a schematic view showing a virtual image display apparatus according to a sixth embodiment of the present invention.

FIG. 12 is a schematic view of a virtual image display apparatus S6 according to a sixth embodiment of the present invention, in which the micro lens array (optical diffusion device) is removed from the apparatus by using a projection lens having a larger projection eye.

The virtual image display apparatus S6 shown in FIG. 12 comprises; a pair of optical projection systems 10, 20, each having a light source 12, a display device 11 and a projection lens 13; a half mirror 70 for reflecting and transmitting the light rays from the optical projection systems 10, 20; a collecting Fresnel lens 31 arranged at a position at which the images of the display devices 11 are formed by the projection lenses 13; and a half mirror 200 for reflecting the light rays.

In this embodiment, the exit pupil of the projection lenses 13 and the observing points 301, 302 of the observing person are in the conjugated relation with respect to the collecting Fresnel lens 31.

A diameter of the exit pupil of the projection lens 13 is formed to be larger than a size of the image at the observing points 301, 302 (a diameter of the pupil) through the collecting Fresnel lens 31. And therefore, a diameter of the light flux from the projection lens 13 can be made larger enough to prevent the hiatus of the images without the micro lens array 32, because the light rays covering the whole image can reach the observing points 301, 302 of the observing person.

A lens diameter of the projection lens 13 becomes generally larger, when it has a larger exit pupil. It is necessary that the exit pupil of the projection lens 13 and the observing points are in the conjugated relation. In case that the pair of projection lenses 13 are arranged in parallel, as in the first embodiment shown in FIG. 1, wherein the diameter of the projection lens is large, then a distance between the exit pupils becomes too large to keep the conjugated relation. Namely, the pair of projection lenses 13 can be hardly arranged in parallel, without causing an interference to each other.

In the above first to fifth embodiments, the diameter of the exit pupil of the projection lens 13 is formed to be smaller than the size of the image at the observing points 301, 302 (the diameter of the pupil) through the collecting Fresnel lens 31. And therefore, even in the case that the pair of the projections lenses 13 are arranged in parallel, a distance between the pair of the projection lenses 13 can be kept at an appropriate amount.

Because of the above reason, the optical projection systems 10, 20 are arranged on the opposite sides of the half mirror 70, as shown in FIG. 12, so that the light rays from one optical projection system is reflected by the half mirror 70, while the light rays from the other optical projection system is transmitted through the mirror 70.

Namely, the exit pupils of the pair of the projection lenses 13 are combined by the combination half mirror 70, so that the exit pupils and the observing points are apparently kept in the conjugated relation. As a result, the micro lens array 32 becomes unnecessary to realize a cost-down of the apparatus.

In this embodiment, the collecting Fresnel lens 31 constitutes an optical light collecting (condensing) device, and the combination half mirror 70 constitutes an optical combination device.

According to the above embodiment, the diameter of the exit pupil of the projection lens 13 is formed to be larger than the size of the image at the observing points 301, 302 (the diameter of the pupil) through the collecting Fresnel lens 31. And therefore, the diameter of the light flux at the focus point can be made larger without the micro lens array (optical diffusion device) 32.

Accordingly, the hiatus of the image can be prevented even when there is the aberration of the lenses, and then the decrease of the visibility can be suppressed. In addition, it is not necessary to track the movements of the observing points.

Since the combination half mirror 70 is provided in this embodiment for combining the images from the pair of optical projection systems 10, 20, the projection lenses 13 can be arranged at optimum places without causing the interference, even when the projection lenses 13 of the optical projection systems 10, 20 are made larger. As a result, the optical system of the apparatus can be prevented from becoming larger in size.

Modification of Sixth Embodiment

In this embodiment, the magnifying Fresnel lens 34 can be arranged, as in the third embodiment, at such a position which is separate from the collecting lens 31 and closer to the observing person, so that the images projected from the optical projection systems 10, 20 and formed on the collecting lens 31 are enlarged and displayed in the distance.

In such a modification, the exit pupil of the projection lens 13 and the observing points 301, 302 of the observing person are arranged to be in the conjugated relation with respect to the principal point, in the case that the collecting Fresnel lens 31 and the magnifying Fresnel lens 34 are regarded as constituting one unified optical system.

Further Modification of Sixth Embodiment

The collecting Fresnel lens 31 can be removed from this virtual image display apparatus S6 of this sixth embodiment, as in the fourth embodiment.

In such a case, in stead of the collecting Fresnel lens 31, the magnifying Fresnel lens 34 shall be provided at a place closer to the observing person (closer to the half mirror 200), as in the fourth embodiment.

Accordingly, the virtual image display apparatus S6 comprises; the pair of optical projection systems 10, 20, each having the light source 12, the display device 11 and the projection lens 13; the combination half mirror 70; the magnifying Fresnel lens 34 provided at the place other than the image location for the optical projection systems 10, 20 and having a function of collecting the light and a function of enlarging the image; and the half mirror 200.

Seventh Embodiment

Figure 13:
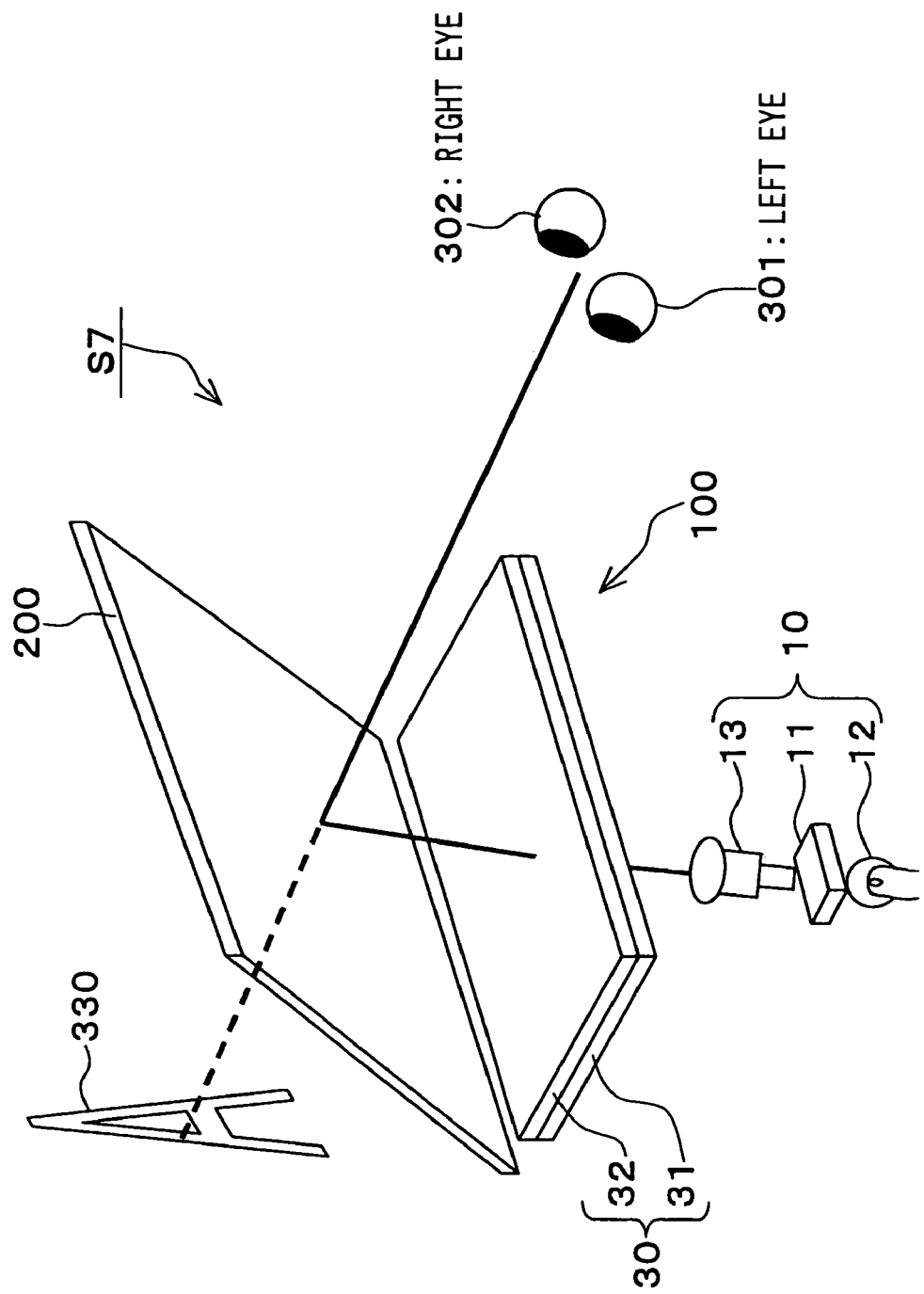
FIG. 13 is a schematic view showing a virtual image display apparatus according to a seventh embodiment of the present invention.

FIG. 13 is a schematic view of a virtual image display apparatus S7 according to a seventh embodiment of the present invention, in which an optical system formed with a fixed focus, not using the parallax.

The virtual image display apparatus S7 shown in FIG. 13 comprises; a single set of optical projection system 10 having a light source 12, a display device 11 and a projection lens 13; a group 30 of lenses having a collecting Fresnel lens 31 and a micro lens array 32; and a half mirror 200.

The group 30 of lenses is arranged at a position at which the image of the display devices 11 is formed by the projection lens 13. The displayed image of the projection lens 13 is reflected by the half mirror 200, so that the virtual image 330 can be recognized by the observing person (the observing points 301, 302) at a backside of the half mirror 200.

In this embodiment, the exit pupil of the projection lens 13 and the observing points 301, 302 of the observing person are in the conjugated relation with respect to the collecting Fresnel lens 31. And the light beams are diffused by the micro lens array 32, so that the light beams are diffused in the whole visible area covering the right and left eyes 301, 302.

In this embodiment, the group 30 of lenses constitutes an optical device for forming an image (an image location optical system), and the micro lens array 32 constitutes an optical diffusion device.

In this apparatus S7, since the image location optical system (the group of lenses) 30 has the optical device (Fresnel lens) 31, as in the first embodiment, so that the exit pupil of the projection lens 13 and the observing points 301, 302 of the observing person are in the conjugated relation, all of the light beams passing through the exit pupil of the projection lens 13 can be collected at the observing points of the observing person and thereby the display image can be made brighter.

In this embodiment, since the micro lens array (optical diffusion device) 32 is provided for diffusing the light rays to the whole visible area, the diameter of the light flux at the focus point can be made larger without making the exit pupil of the projection lens 13.

Accordingly, the hiatus of the image can be prevented even when there is the aberration of the lenses, and then the decrease of the visibility can be suppressed. In addition, it is not necessary to track the movements of the observing points.

As above, according to the embodiment, the optical device can be made smaller with a simpler structure, and at the same time the image of high quality can be obtained. In addition, since the light collecting performance is high, a brighter virtual image display apparatus can be obtained, although the visible distance is fixed.

Modification of Seventh Embodiment

In this embodiment, the magnifying Fresnel lens 34 can be arranged, as in the third embodiment, at such a position which is separate from the group 30 of lenses (comprising the collecting lens 31 and the micro lens array 32) and closer to the observing person, so that the image projected from the optical projection system 10 and formed on the group 30 of lenses is enlarged and displayed in the distance.

In such a modification, the exit pupil of the projection lens 13 and the observing points 301, 302 of the observing person are arranged to be in the conjugated relation with respect to the principal point, in the case that the collecting Fresnel lens 31 and the magnifying Fresnel lens 34 are regarded as constituting one unified optical system.

The collecting Fresnel lens 31 can be removed from this virtual image display apparatus S7 of this seventh embodiment, as in the fourth embodiment.

In this case, the virtual image display apparatus S7 comprises; the single set of the optical projection system 10 having the light source 12, the display device 11 and the projection lens 13; the micro lens array 32; the magnifying Fresnel lens 34 having a function of collecting the light and a function of enlarging the image; and the half mirror 200.

OTHER MODIFICATIONS

When the micro lens array 32 is used as the optical diffusion device, the curvature of the micro lens array 32 in the vertical direction is preferably made smaller than that in the horizontal direction, as in the first embodiment. This can be also applied to the other embodiments than the first embodiment.

The optical diffusion device in the embodiments shall not be limited to the micro lens array. For example, a laminated body of a lenticular lens for diffusing the light beams in the horizontal direction and a lenticular lens for diffusing the light beams in the vertical direction can be used.

Furthermore, such a single lens can be used as the optical diffusion device, in which a lenticular lens for diffusing the light beams in the horizontal direction is formed on a front surface, while a lenticular lens for diffusing the light beams in the vertical direction is formed on the back surface thereof.

Even in the case that the lenticular lens (or lenses) is used as the optical diffusion device, the curvature of the lens for diffusing the light beams in the vertical direction is preferably made smaller than that in the horizontal direction. With this arrangement, it becomes almost not necessary to track the movement of the observing eyes in the vertical direction, as in the case in which the micro lens array is used.

It is explained in the above embodiments, that the prism sheet 33 can be used to achieve a smaller sized apparatus by refracting the optical path, wherein the exit angle of the light beams is arranged to be smaller than the incident angle from the optical projection system 10, 20. This is applied to all of the above embodiments.

The lens for refracting the optical path shall not be limited to the prism sheet 33 in the above embodiments. For example, a Fresnel lens of an off-axis type can be used. In this case, the exit angle of the light beams is also arranged to be smaller than the incident angle from the optical projection system 10, 20.

In a modified embodiment shown in FIG. 7, the mirror 42 is provided in the path from the light source 12 to the half mirror 200 to refract the light path, so that a smaller sized apparatus can be realized. This is applied to all of the other embodiments.

Furthermore, in the modified embodiment shown in FIG. 7, there are provided with the camera 40 for detecting the positions of the observing points 301, 302, and the mirror 42 and the motor for guiding the light rays to the observing points, so that the tracking of the movement of the observing points in the horizontal direction can be properly performed.

The above tracking device for detecting the positions of the observing points can be also applied to the other embodiments.

The mirror 42 can be arranged at a position between the optical projection systems 10, 20 and the group 30 of lenses, or at a position between the group 60 of mirrors and the group 30 of lenses in case of the embodiment shown in FIG. 11. In the embodiment shown in FIG. 12, the combination half mirror 70 itself can be rotated.

The means for guiding the light rays shall not be limited to the rotating mirror 42 in the above embodiments.

For example, the optical device arranged at the position of the image location from the optical projection systems 10, 20, or the optical device for magnifying the image from the optical projection systems 10, 20 can be moved in a sliding manner. The optical projection systems 10, 20 can be slidably moved.

In the modified embodiment shown in FIG. 7, the image on the display device 11 is in advance deformed, so that the virtual image will be amended to obtain the image in a good condition (without deformation).

This can be also applied to the other embodiments.

A prism sheet 33 for refracting the light rays can be provided to the virtual image display apparatus not only in the embodiment of FIG. 8 but also in the other embodiments. With this arrangement, the optical system of the apparatus can be made further smaller.

An optical magnifying device (the magnifying Fresnel lens) 34 for enlarging the image formed by the optical projection systems can be provided not only in the third and fourth embodiments but also in the other embodiments, so that the image forming length for the virtual images 310, 320 can be made longer to improve the visibility.

In other words, the magnifying device can be arranged at such a position which is separate from the group of lenses 30 (the collecting lens 31 and/or the micro lens array 32) and closer to the observing person, so that the images projected from the optical projection systems (10, 20) and formed on the group of lenses 30 are enlarged and displayed in the distance.

According to the virtual image display apparatus of this invention, the optical system can be prevented from becoming larger in size, because the visible distance between the observing points and the visible point, at which the virtual image is recognized by the observing person, can be changed by moving the displayed images on the display devices 11 of the optical projection systems 10, 20. Namely, according to such structure, the optical system may not be physically moved.

In any of the embodiments mentioned above, the exit pupil of the projection lens 13 and the observing points 301, 302 of the observing person are in the conjugated relation with respect to the principal point. As a result, all of the light rays passing through the exit pupil of the projection lens 13 can be collected at the observing points of the observing person and thereby the display image can be made brighter.

Furthermore, according to the embodiments in which the optical diffusion device (micro lens array) 32 is provided, the diameter of the light flux can be made larger to such extent that the light rays to one of the observing points may not reach the other observing point, without making larger the exit pupil of the projection lens 13.

Accordingly, the hiatus of the image can be prevented even when there is the aberration of the lenses, and then the decrease of the visibility can be suppressed. In addition, it is not necessary to track the movements of the observing points.

As above, according to the present invention, the optical system can be made smaller with a simpler structure, and at the same time the image of high quality can be obtained.

What is claimed is:

1. A virtual image display apparatus comprising:
an optical unit for projecting an image; and
a translucent reflecting means for reflecting the image from the optical unit, so that the image can be recognized by an observing person at its observing points as a virtual image, wherein the image from the respective observing points is overlapped in the distance,
wherein the optical unit comprises:
a pair of optical projection systems, each having a display device for displaying a respective image thereon, a light source for illuminating the display device and a projection lens for projecting the image of the display device, the pair of optical projection systems projecting the respective images corresponding to right and left eyes of the observing person; and
an image location optical system arranged at an image focus location at which the respective images from the pair of optical projection systems are formed,
wherein the image location optical system comprises:
an optical device for forming a conjugated relation between an exit pupil of the projection lens and the observing points of the observing person; and
an optical diffusion device for diffusing light rays to an extent that the light rays to one of the observing points may not reach the other observing point.

2. A virtual image display apparatus comprising:
an optical unit for projecting an image; and
a translucent reflecting means for reflecting the image from the optical unit, so that the image can be recognized by an observing person at its observing points as a virtual image, wherein the image from the respective observing points is overlapped in the distance,
wherein the optical unit comprises:
a pair of optical projection systems, each having a display device for displaying a respective image thereon, a light source for illuminating the display device and a projection lens for projecting the image of the display device, the pair of optical projection systems projecting the respective images corresponding to right and left eyes of the observing person;
an image location optical system arranged at an image focus location at which the respective images from the pair of optical projection systems are formed; and
an optical magnifying device for magnifying the image formed by the pair of optical projection systems;
wherein the image location optical system comprises:
an optical collecting device for collecting light rays; and
an optical diffusion device for diffusing light rays to an extent that the light rays to one of the observing points may not reach the other observing point, and
an exit pupil of the projection lens and the observing points of the observing person are in a conjugated relation with respect to a principal point in the case that the optical collecting device and the optical diffusion device are regarded as one unified optical system.

3. A virtual image display apparatus comprising:
an optical unit for projecting an image; and
a translucent reflecting means for reflecting the image from the optical unit, so that the image can be recognized by an observing person at its observing points as a virtual image, wherein the image from the respective observing points is overlapped in the distance,
wherein the optical unit comprises:
a pair of optical projection systems, each having a display device for displaying a respective image thereon, a light source for illuminating the display device and a projection lens for projecting the image of the display device, the pair of optical projection systems projecting the respective images corresponding to right and left eyes of the observing person;
an optical diffusion device arranged at an image focus location at which the respective images from the pair of optical projection systems are formed, and for diffusing light rays to an extent that the light rays to one of the observing points may not reach the other observing point; and an optical magnifying device for magnifying the image formed by the pair of optical projection systems, wherein an exit pupil of the projection lens and the observing points of the observing person are in a conjugated relation with respect to a principal point of the optical magnifying device.

4. A virtual image display apparatus comprising:
an optical unit for projecting an image; and
a translucent reflecting means for reflecting the image from the optical unit, so that the image can be recognized by an observing person at its observing points as a virtual image, wherein the image from the respective observing points is overlapped in the distance,
wherein the optical unit comprises:
an optical projection system having a display device for displaying the image thereon, a light source for illuminating the display device and a projection lens for projecting the image of the display device;
an optical image separator for separating the image from the optical projection system into two images; and
an image location optical system arranged at an image focus location at which the respective images, which are separated by the optical image separator, are formed,
wherein the image location optical system comprises:
an optical device for forming a conjugated relation between an exit pupil of the projection lens and the observing points of the observing person; and
an optical diffusion device for diffusing light rays to an extent that the light rays to one of the observing points may not reach the other observing point.

5. A virtual image display apparatus comprising:
an optical unit for projecting an image; and
a translucent reflecting means for reflecting the image from the optical unit, so that the image can be recognized by an observing person at its observing points as a virtual image, wherein the image from the respective observing points is overlapped in the distance,
wherein the optical unit comprises:
an optical projection system having a display device for displaying the image thereon, a light source for illuminating the display device and a projection lens for projecting the image of the display device;
an optical image separator for separating the image from the optical projection system into two images;
an image location optical system arranged at an image focus location at which the respective images, which are separated by the optical image separator, are formed; and
an optical magnifying device for magnifying the image formed by the respective images separated by the optical image separator,
wherein the image location optical system comprises:
an optical collecting device for collecting light rays; and
an optical diffusion device for diffusing light rays to an extent that the light rays to one of the observing points may not reach the other observing point, and
an exit pupil of the projection lens and the observing points of the observing person are in a conjugated relation with respect to a principal point in the case that the optical collecting device and the optical magnifying device are regarded as one unified optical system.

6. A virtual image display apparatus comprising:
an optical unit for projecting an image; and a translucent reflecting means for reflecting the image from the optical unit, so that the image can be recognized by an observing person at its observing points as a virtual image, wherein the image from the respective observing points is overlapped in the distance,
wherein the optical unit comprises:
an optical projection system having a display device for displaying an image thereon, a light source for illuminating the display device and a projection lens for projecting the image of the display device;
an optical image separator for separating the image from the optical projection system into two images; and
an optical diffusion device arranged at an image focus location at which the respective images, which are separated by the optical image separator, are formed, and for diffusing light rays to an extent that the light rays to one of the observing points may not reach the other observing point;
an optical magnifying system for magnifying the image formed by the respective images separated by the optical image separator,
wherein an exit pupil of the projection lens and the observing points of the observing person are in a conjugated relation with respect to a principal point of the optical magnifying system.

7. A virtual image display apparatus comprising:
an optical unit for projecting an image; and
a translucent reflecting means for reflecting the image from the optical unit, so that the image can be recognized by an observing person at its observing points is a virtual image, wherein the image from the respective observing points is overlapped in the distance,
wherein the optical unit comprises:
a pair of optical projection systems, each having a display device for displaying a respective image thereon, a light source for illuminating the display device and a projection lens for projecting the image of the display device, the pair of optical projection systems projecting the respective images corresponding to right and left eyes of the observing person;
an optical combining system for combining the respective images from the pair of the optical projection systems; and
an image location optical system arranged at an image focus location at which the respective images from the pair of optical projection systems are formed,
wherein the image location optical system forms a conjugated relation between an exit pupil of the projection lens and the observing points of the observing person, and
a diameter of the exit pupil of the projection lens is larger than a size of the image at the observing points formed by the image location optical system.

8. A virtual image display apparatus comprising:
an optical unit for projecting an image; and
a translucent reflecting means for reflecting the image from the optical unit, so that the image can be recognized by an observing person at its observing points as a virtual image, wherein the image from the respective observing points is overlapped in the distance,
wherein the optical unit comprises:
a pair of optical projection systems, each having a display device for displaying a respective image thereon, a light source for illuminating the display device and a projection lens for projecting the image of the display device, the pair of optical projection systems projecting the respective images corresponding to right and left eyes of the observing person;

an optical combining system for combining the respective images from the pair of the optical projection systems;

an optical collecting device arranged at an image focus location at which the respective images from the pair of optical projection systems are formed; and an optical magnifying system for magnifying the image formed by the respective images from the pair of optical projection systems, wherein an exit pupil of the projection lens and the observing points of the observing person are in a conjugated relation with respect to a principal point in the case that the optical collecting device and the optical magnifying system are regarded as one unified optical system, and a diameter of the exit pupil of the projection lens is larger than a size of the image at the observing points formed by the optical collecting device.

9. A virtual image display apparatus comprising:

an optical unit for projecting an image; and a translucent reflecting means for reflecting the image from the optical unit, so that the image can be recognized by an observing person at its observing points as a virtual image, wherein the image from the respective observing points is overlapped in the distance, wherein the optical unit comprises:

a pair of optical projection systems, each having a display device for displaying a respective image thereon, a light source for illuminating the display device and a projection lens for projecting the image of the display device, the pair of optical projection systems projecting the respective images corresponding to right and left eyes of the observing person;

an optical combining system for combining the respective images from the pair of the optical projection systems;

an optical magnifying device arranged at such a position which is different from an image focus location, at which the respective images from the pair of optical projection systems are formed, and for magnifying the image formed by the respective images from the pair of optical projection systems, wherein an exit pupil of the projection lens and the observing points of the observing person are in a conjugated relation with respect to a principal point of the optical magnifying device, and a diameter of the exit pupil of the projection lens is larger than a size of the image at the observing points formed by the optical collecting device.

10. A virtual image display apparatus comprising:

an optical unit for projecting an image; and a translucent reflecting means for reflecting the image from the optical unit, so that the image can be recognized by an observing person at its observing points as a virtual image, wherein the image form the respective observing points is overlapped in the distance, wherein the optical unit comprises:

a single set of optical projection system having a display device for displaying the image thereon, a light source for illuminating the display device and a projection lens for projecting the image of the display device; and an image location optical system arranged at an image focus location at which the image from the optical projection system is formed, wherein the image location optical system comprises:

an optical device for forming a conjugated relation between an exit pupil of the projection lens and the observing points of the observing person; and an optical diffusion device for diffusing light rays to all visible area.

11. A virtual image display apparatus comprising:

an optical unit for projecting an image; and a translucent reflecting means for reflecting the image from the optical unit, so that the image can be recognized by an observing person at its observing points as a virtual image, wherein the image from the respective observing points is overlapped in the distance, wherein the optical unit comprises:

a single set of optical projection system having a display device for displaying the image thereon, a light source for illuminating the display device and a projection lens for projecting the image of the display device;

an image location optical system arranged at an image focus location at which the image from the optical projection system is formed; and an optical magnifying device for magnifying the image formed by the optical projection system, wherein the image location optical system comprises:

an optical collecting device and an optical diffusion device for diffusing light rays to all visible area; and an exit pupil of the projection lens and the observing points of the observing person are in a conjugated relation with respect to a principal point in the case that the optical collecting device and the optical magnifying device are regarded as one unified optical system.

12. A virtual image display apparatus comprising:

an optical unit for projecting an image; and a translucent reflecting means for reflecting the image from the optical unit, so that the image can be recognized by an observing person at its observing points as a virtual image, wherein the image from the respective observing points is overlapped in the distance, wherein the optical unit comprises:

a single set of optical projection system having a display device for displaying the image thereon, a light source for illuminating the display device and a projection lens for projecting the image of the display device;

an optical diffusion device arranged at an image focus location at which the image from the optical projection system is formed and for diffusing light rays to all visible area; and an optical magnifying device for magnifying the image formed by the optical projection system, wherein an exit pupil of to projection lens and the observing points of the observing person are in a conjugated relation with respect to a principal point of the optical magnifying device.

13. A virtual image display apparatus according to claim 1, further comprising:

an optical device for refracting light rays in a path from the optical projection system to the translucent reflecting means.

14. A virtual image display apparatus according to claim 1, wherein the optical diffusion device comprises a micro lens array.

15. A virtual image display apparatus according to claim 1, wherein the optical diffusion device comprises a micro lens array, and a curvature thereof in the vertical direction is smaller than that in the horizontal direction.

16. A virtual image display apparatus according to claim 1, wherein the optical diffusion device comprises a laminated body of a lenticular lens for diffusing the light rays in the horizontal direction and a lenticular lens for diffusing the light rays in the vertical direction.

17. A virtual image display apparatus according to claim 16, wherein
a curvature of the lenticular lens for diffusing the light rays in the vertical direction is smaller than that of the lenticular lens for diffusing the light rays in the horizontal direction.

18. A virtual image display apparatus according to claim 1, wherein
the optical diffusion device comprises:
a lenticular lens formed on a front surface for diffusing the light rays in the horizontal direction; and
a lenticular lens formed on a back surface for diffusing the light rays in the vertical direction.

19. A virtual image display apparatus according to claim 18, wherein
a curvature of the lenticular lens for diffusing the light rays in the vertical direction is smaller than that of the lenticular lens for diffusing the light rays in the horizontal direction.

20. A virtual image display apparatus according to claim 1, further comprising:
an optical device of a prism sheet for refracting light rays in a path from the optical projection system to the translucent reflecting means.

21. A virtual image display apparatus according to claim 1, further comprising:
an optical device of Fresnel lens of an off-axis type for refracting light rays in a path from the optical projection system to the translucent reflecting means.

22. A virtual image display apparatus according to claim 1, further comprising:
an optical device for refracting light rays in a path from the optical projection system to the translucent reflecting means, wherein an incident angle of light rays from the optical projection system is larger than an exit angle of the refracted light rays.

23. A virtual image display apparatus according to claim 1, further comprising:
a mirror for refracting light rays in a path from the optical projection system to the translucent reflecting means.

24. A virtual image display apparatus according to claim 1, further comprising:
a camera for detecting positions of the observing points; and
a guiding means for guiding the light rays in accordance with the detected positions so that the light rays reach the observing points.

25. A virtual image display apparatus according claim 24, wherein the guiding means comprises a mirror which will be rotated to guide the light rays.

26. A virtual image display apparatus according claim 24, wherein the guiding means moves at least one of the following components in a sliding manner,
the components being;
the optical projection systems;
the image location optical system;
the light collecting device;
the optical diffusion device; and
the optical magnifying device.

27. A virtual image display apparatus according to claim 1, wherein
the image of the display device is in advance deformed so that the image projected from the optical projection system can be obtained without deformation.

28. A virtual image display apparatus according to claim 1, wherein
the image of the display device is in advance deformed so that the virtual image on the translucent reflecting means can be obtained without deformation.

* * * * *